United States Patent [19]

Nagano

[11] 3,948,144
[45] Apr. 6, 1976

[54] PERITROCHOID CURVED SURFACE GENERATING APPARATUS

[75] Inventor: Masaaki Nagano, Toda, Japan

[73] Assignees: Yutaka Seimitsu Kogyo Ltd., Yono; Toyota Jidosha Kogyo Kabushiki Kaisha, Toyota, both of Japan

[22] Filed: Oct. 26, 1973

[21] Appl. No.: 410,277

[30] Foreign Application Priority Data
Nov. 3, 1972 Japan.............................. 47-109917

[52] U.S. Cl................ 90/20; 51/33 W; 51/DIG. 32; 90/15 B
[51] Int. Cl.². .......................................... B23C 1/14
[58] Field of Search.................... 90/20, 15 A, 15 B; 51/33 W, DIG. 32; 74/410, 413–414, 801

[56] References Cited
UNITED STATES PATENTS
3,757,474  9/1973  Pedersen............................ 51/33 W Primary Examiner—J. M. Meister
Assistant Examiner—Fred A. Silverberg
Attorney, Agent, or Firm—Silverman & Cass, Ltd.

[57] ABSTRACT

A peritrochoid curved surface generating apparatus comprises an outer cylinder rotatably supported on a frame, a first central shaft rotatably journalled in the rotating axis of the outer cylinder, an inner cylinder adjustably fixed within an eccentric opening of the outer cylinder, an inner cylinder central shaft rotatably journalled in an axis of the inner cylinder, a second central shaft rotatably journalled in an eccentric opening of the inner cylinder and supporting a work table, a gear train for transmitting the rotation of the first central shaft to the second central shaft through the inner cylinder central shaft, a cylindrical tool rotatable about its axis and a rocking device supporting the tool and rockable in synchronism with the rotation of the outer cylinder. A distance between the first and second shafts is adjustable and a rocking angle of the rocking device is also adjustable, so that the apparatus can be used for generating various peritrochoid curved surfaces different in configuration without any interference between a tool and a workpiece.

6 Claims, 8 Drawing Figures

FIG_1
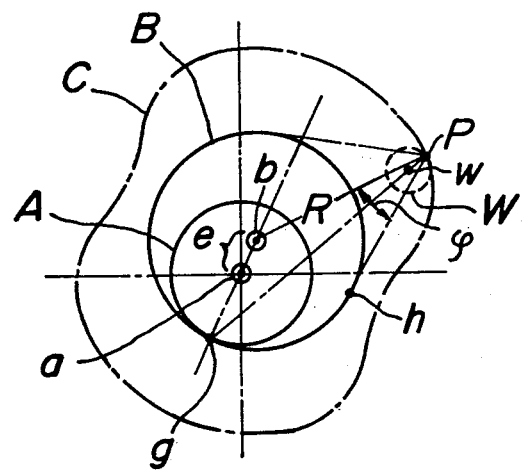
FIG_6
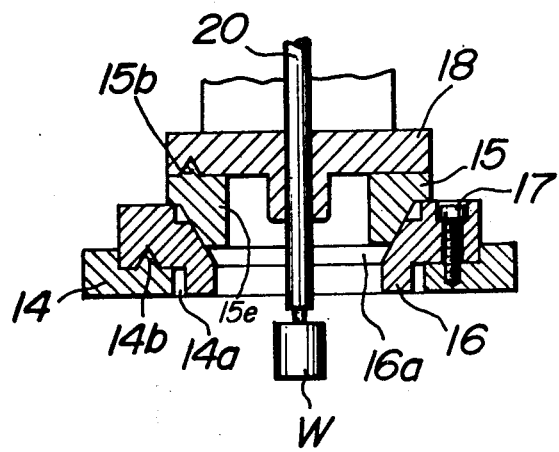

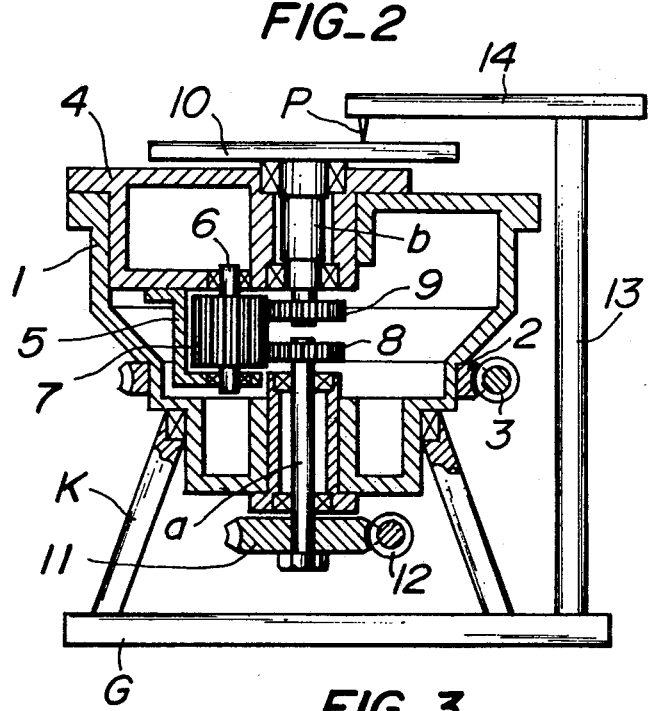
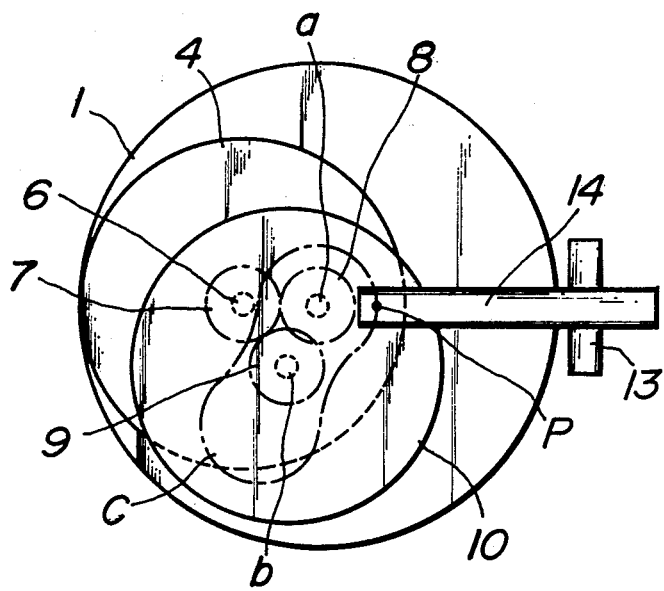

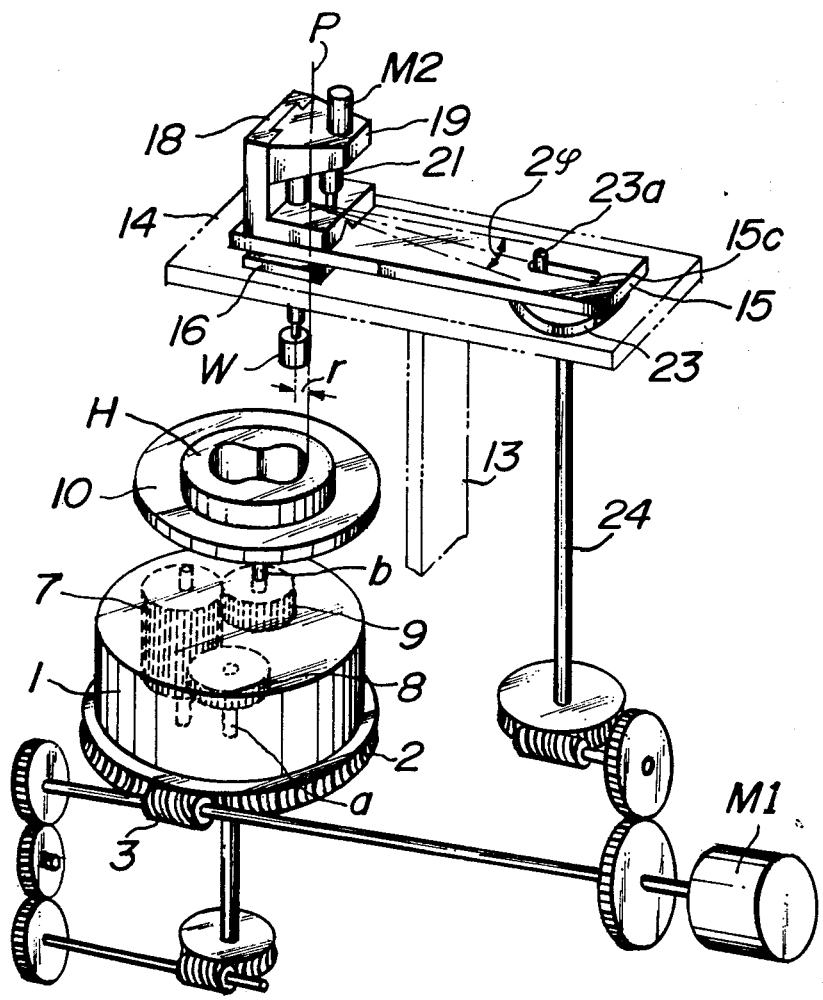

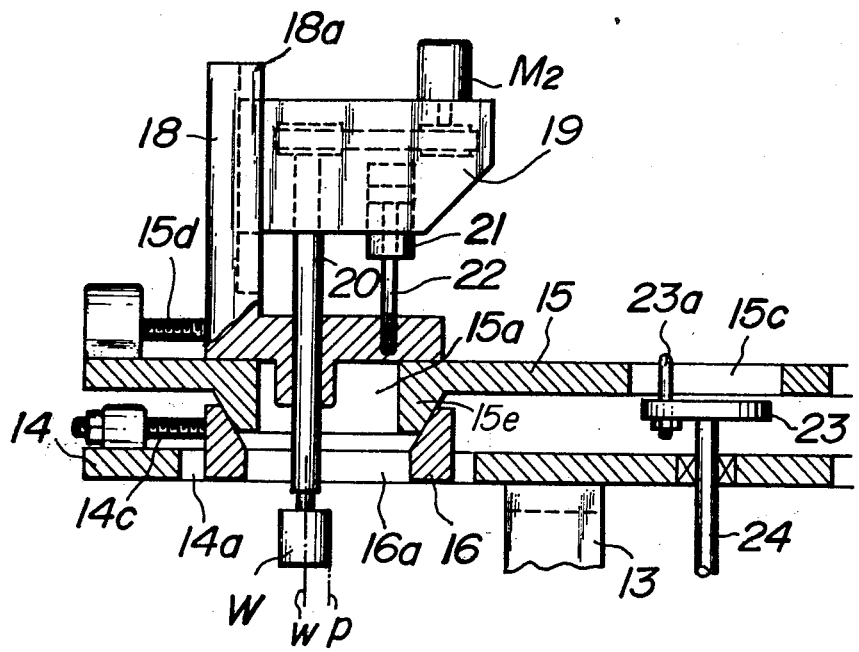
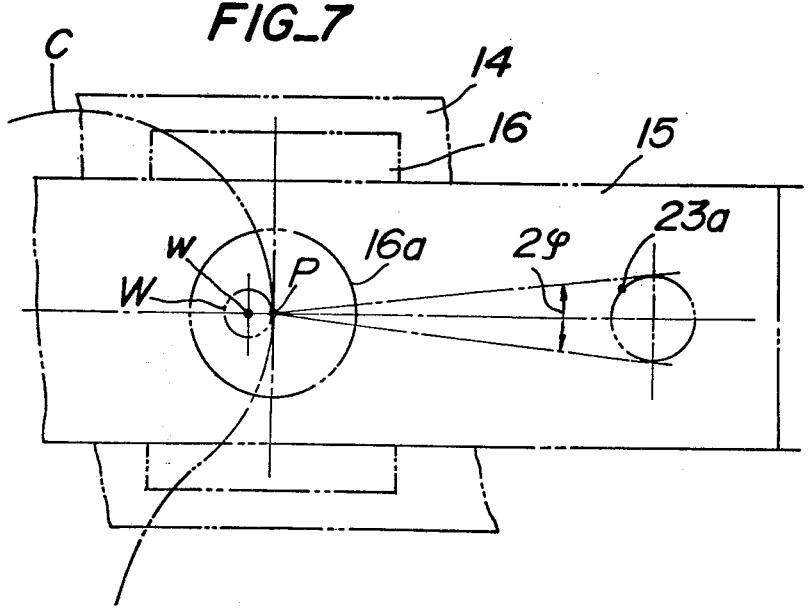

PERITROCHOID CURVED SURFACE GENERATING APPARATUS

BACKGROUND OF THE INVENTION

1. Field of the Invention:

This invention relates to a peritrochoid curved surface generating apparatus using a pointed tool to generate peritrochoid curves or using a cylindrical tool such as a grinding wheel or milling cutter to generate peritrochoid curved surfaces in a workpiece.

2. Description of the Prior Art

A housing of a rotary engine of which inside has a peritrochoid curved surface has been known. However, there has not been suggested any effective apparatus which can be used for generating the particular curved surface by simple and easy operation. It may be easy for those skilled in the art to devise a mechanism to move a tool properly along a peritrochoid curve. However, when various workpieces each having a peritrochoid curved surface different in configuration must be worked, such a mechanism needs to replace main parts for generating a desired curved surface and consequently requires accurate adjustment of the parts and considerable time for the adjustment. Another problem of this kind of the mechanism is to avoid an interference of a tool with a workpiece because an actual tool, mostly a cylindrical tool such as a grinding wheel or milling cutter has a certain length of diameter. Consequently, in order to avoid the interference between the tool and workpiece to perform a multiplicity of operations, it is required a further skillful consideration.

SUMMARY OF THE INVENTION

In one aspect, the invention provides a peritrochoid curved surface generating apparatus which comprises an outer cylinder rotatably supported by a frame on a base and formed in its upper end with an eccentric opening, a first central shaft rotatably journalled in the rotating axis of said outer cylinder, an inner cylinder accommodated within and fixed to said eccentric opening of said outer cylinder in an adjustable angular relationship therebetween and formed with an eccentric opening, an inner cylinder central shaft rotatably journalled in an axis of said inner cylinder, a second central shaft rotatably journalled in said eccentric opening of said inner cylinder and supporting on its upper end a work table fixed thereto, a gear train for transmitting the rotation of the first central shaft to the second central shaft through the inner cylinder central shaft, and a pointed tool fixed to a base of the apparatus and extending to said work table, whereby said first and second central shafts are maintained spaced apart a determined distance and said first central shaft and said outer cylinder are relatively rotated in a determined geared relation.

In another aspect, the invention provides a peritrochoid curved surface generating apparatus which comprises an outer cylinder rotatably supported by a frame on a base and formed in its upper end with an eccentric opening, a first central shaft rotatably journalled in the rotating axis of said outer cylinder, an inner cylinder accommodated within and fixed to said eccentric opening of said outer cylinder in an adjustable angular relationship therebetween and formed with an eccentric opening, an inner cylinder central shaft rotatably journalled in an axis of said inner cylinder, a second shaft rotatably journalled in said eccentric opening of said inner cylinder and supporting on its upper end a work table fixed thereto, a gear train for transmitting the rotation of the first central shaft to the second central shaft through the inner cylinder central shaft, rocking means rockable within a determined angle about a determined point on said base plate, and a cylindrical tool rotatable about its axis and mounted on said rocking means, the circumference of said tool being in contact with the rocking axis of said rocking means, whereby said first and second central shafts are maintained spaced apart a determined distance and said first central shaft and said outer cylinder are relatively rotated in a determined geared relation, while said rocking means is adapted to rock in a geared relation to the rotation of said outer cylinder.

In further aspect, the invention provides a peritrochoid curved surface generating apparatus wherein said rocking means consists of a rectangular base plate substantially horizontally fixed to a column on a base above said work table and formed with an opening and a guide way, a ring bearing plate formed in its center with a circular opening and adapted to be fixed to said opening of said rectangular base plate after slidably adjusted along said guide way of said base plate, a rocking plate formed with a linear guide way and an elongated slot and formed with a circular opening within which a ring is fitted, said rocking plate being pivotally connected through said ring to said ring bearing plate, a column provided with a substantially vertical slide way and slidable along said guide way of said rocking plate, a saddle vertically slidable along said slide way of said column, a spindle rotatably supported vertically in said saddle and passing loosely through said openings of said rocking and ring bearing plates and provided at its lower end with a cylindrical tool, and a crank disc provided with a crank pin which is adjustable in a radial direction of the crank disc and engages the inside of said elongated slot, said crank disc being adapted to rotate in synchronism with the rotation of said outer cylinder, whereby the axis of the rocking movement and the maximum rocking angle of said rocking plate are adjustable.

A general object of the present invention is to provide an improved peritrochoid curved surface generating apparatus that will overcome the aforementioned problems of such kind of apparatuses.

Other object of the present invention is to provide a peritrochoid curved surface generating apparatus which is able to generate various peritrochoid curves or curved surfaces different in configuration by a simple adjustment of parts and to avoid any interference between a tool and a workpiece and which is simple in construction, positive in operation and economical of manufacture.

The foregoing objects and other objects as well as the characteristic features of the invention will become more apparent and more readily understandable by the following description and the appended claims when read in conjunction with accompanying drawings.

BRIEF DESCRIPTION OF THE DRAWINGS

FIG. 1 is an explanatory illustration of a peritrochoid curve;

FIG. 2 is a sectional front elevation of one embodiment of the apparatus according to the invention generating a peritrochoid curve;

FIG. 3 is a plan view of the apparatus shown in FIG. 2;

FIG. 4 is a diagrammatic perspective view of another embodiment of the apparatus according to the invention;

FIG. 5 is an elevation partly in section of the rocking mechanism of the apparatus shown in FIG. 6;

FIG. 6 is a side view of the mechanism shown in FIG. 5; and

FIG. 7 is a schematic plan view of the mechanism shown in FIG. 5.

DESCRIPTION OF THE PREFERRED EMBODIMENTS

Figure 8:
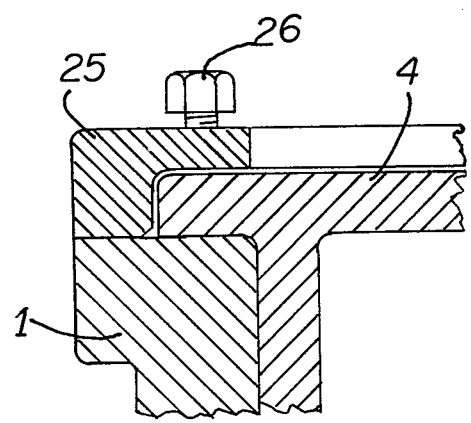
FIG. 8 is a fragmentary sectional representation illustrating adjustment for eccentricity.

Referring to FIG. 1, a peritrochoid curve will be explained to clarify the exact meaning of the term "peritrochoid". A base circle A having a center $a$ is fixed to a plane in FIG. 1. A circle B, with which the base circle A is in internal contact, has a center $b$ and a larger diameter than that of the base circle and rolls on it without sliding. In the rolling movement, a pointed end P of an arm $bP$ fixed to the rolling circle B describes a curve C indicated in a dot-dash-line which has been referred to as a peritrochoid curve. The length of the arm $bP$ is a peritrochoid generating radius R while the distance $ab$ between the centers of the base and rolling circles A and B, that is, the difference between the lengths of the radii of the circles, is an eccentricity $e$. It has been known that a contour enclosed by a peritrochoid curve is determined depending upon the radius of the base circle, the eccentricity $e$ and the peritrochoid generating radius R.

In the example in FIG. 1, the ratio of the radii of the base and rolling circles A and B is 2:3. In this case, if the circle B is fixed and the circle A is rotated about its center $a$ together with a paper to which the base circle is fixed, then the pointed end P will describe a third of the curve C. If the circle B rotates, it will describe a half of the curve C. Namely, the curve C will be completed during three rotations of the base circle A and two rotations of the rolling circle B. In fact these circles rotate relatively to each other in opposite directions, so that the curve C will be completed while the rolling circle B rotates two revolutions in one direction and the base circle A rotates simultaneously one revolution in the opposite direction. In other wards, the circle B is adapted to revolve two revolutions about the center $a$ of the base circle A during one rotation of the circle B in the reverse direction about the center $b$ of itself spaced apart the eccentricity $e$ from the center $a$.

FIGS. 2 and 3 illustrate one embodiment of the apparatus according to the invention generating a peritrochoid curve. On a base G is stationarily mounted a frame K provided with a circular metal supporting an outer cylinder 1, which is provided at its periphery with a worm gear 2 and is rotatively driven by a worm 3 in mesh with the worm gear 2. A central shaft $a$ is vertically journalled rotatively in the outer cylinder 1 by means of anti-friction bearings as shown. The outer cylinder 1 is formed in its upper end with an eccentric opening in which is accommodated an inner cylinder 4 which will be explained hereinafter. To the lower end is fixed a bracket 5 rotatively supporting an inner cylinder central shaft 6 by means of anti-friction bearings as shown, to which is fixed an idle gear 7. The inner cylinder 4 is fixed to the outer cylinder 1 in a determined angular relationship thereto but angularly adjustable in the eccentric opening of the outer cylinder 1. The inner cylinder 4 is further formed with an eccentric opening which is eccentric to the central shaft 6 and rotatably journals a central shaft $b$. The central shaft $b$ is provided at its lower end with a gear 9 fixed thereto in mesh with the idle gear 7 and at its upper end with a work table 10 fixed thereto. The central shaft $a$ is provided at its upper end with a gear 8 fixed thereto in mesh with the idle gear 7 of the shaft 6 and at its lower end with a worm gear 11 fixed thereto which is in mesh with a worm 12. A base plate 14 is fixedly supported by a column 13 on the base G and is provided at its end with a needle P extending toward the work table 10. For the convenience of illustration, the center axes of the shafts $a$, $b$ and 6 are shown in one plane in FIG. 2.

The worm 12 drives the central shaft $a$ which in turn rotatively drives the central shaft $b$ about its axis through the gears 8, 7, and 9. On the other hand the worm 3 drives the outer cylinder 1 so that the central shaft $b$ revolves about the central shaft $a$. The eccentricity $e$, that is, the distance between the central shafts $a$ and $b$, can be adjusted by rotating the inner cylinder 4 within the eccentric opening of the outer cylinder 1. Accordingly, the inner cylinder 4 is fixed to the outer cylinder 1 after the distance between the central shafts $a$ and $b$ has been adjusted so as to be coincident with the eccentricity $e$. With the relation between the outer and inner cylinders, the outer cylinder 1 is rotated two rotations in one direction while at the same time the work table 10 is rotated one rotation in the opposite direction, so that the stationary point P describes a peritrochoid curve on the work table. It can be seen from the above description that the apparatus according to the invention has an advantage in that the eccentricity is adjustable.

In order to adjust the eccentricity to meet a peritrochoid curve as above described, after the inner cylinder 4 has been adjustably rotated in the eccentric opening of the outer cylinder, the inner cylinder is clamped to the outer cylinder. As an example, as represented in FIG. 8, the outer cylinder is provided with a fastening ring 25 bolted thereto or securely mounted thereon. The fastening ring is located over and encircling a top flange of the inner cylinder and is formed with a series of threaded holes (not shown) in a circle concentric to the flange. Tightening setscrews 26 threadedly fitted in the threaded holes of the flange of the outer cylinder causes the top flange of the inner cylinder to be urged against the outer cylinder to secure the inner and outer cylinders together with each other. Any clamping method other than this will of course be used for that purpose.

One embodiment of the peritrochoid curved surface generating apparatus using a cylindrical tool according to the invention will be explained hereinafter. Although in the embodiment a grinding wheel is used as a cylindrical tool, it is to be understood that other tools such as a milling cutter can be utilized for this purpose. Referring back to FIGS. 1 and 2, the point P of the arm spaced the peritrochoid generating radius R from the center $b$ describes the peritrochoid curve. In the curved surface generating apparatus, however, the tool is a grinding wheel or a milling cutter having a diameter instead of a pointed tool, so that the wheel W must be in contact with a curved surface to be generated at the point P and a central axis W is in a normal to the trochoid curve at the point P. An instantaneous center of the curve C at point P is a contact point $g$ where the circles A and B are in contact with each other. The line Pg connecting the points P and g is a normal to the trochoid curve. The normal will swing about the point P. In order to avoid an interference of the grinding wheel W with a workpiece to be worked, the axis w of the grinding wheel must always be in the normal. An angle made by the trochoid normal Pg with the peritrochoid generating radius Pb or R, which is referred to as a rocking angle, is not more than the angle $\phi$ made by a tangent Ph with the radius Pb, which angle $\phi$ can be obtained by calculation. Consequently, the rocking angle of normal Pg is within the angle $2\phi$. In the peritrochoid curve, the maximum rocking angle will occur four times until one curve C is completed because the normal Pg reciprocates two times within the area defined by the angle $2\phi$. As previously described, the rolling circle B rotates two times until one curve C is completed. Accordingly, if the grinding wheel W is maintained in contact with the point P and mounted on a rocking plate rockable about the point P, which rocking plate is adapted to rock reciprocatively one time within the angle $2\phi$ in synchronism with one rotation of the rolling circle B, the grinding wheel W can grind the article to a desired peritrochoid curved surface without any interference with the surface while the axis w of the grinding wheel is always kept in the normal to the curve.

FIG. 4 illustrates one embodiment of the peritrochoid curved surface generating apparatus based on the above principle. A motor M1 rotatively drives an outer cylinder 1 through a worm 3 and a worm gear 2 and simultaneously drives a central shaft $a$ to rotate the central shaft $b$ through gears 8, 7 and 9. Separate from these driving mechanisms, a base plate 14 is fixedly supported by a column 13 on a base. It is assumed that a point P on the base plate projects itself on a work table 10 to describe a curve C. The above arrangement is substantially the same as that of the peritrochoid curve generating apparatus explained in connection with FIG. 2 with the exception that a rocking plate 15 is mounted rockably about the point P on the base plate 14 and is provided with a grinding wheel W rotatable about its axis of which circumference is in contact with the curve C at the point P. The rocking plate rocks within an angle of $2\phi$ which is bisected by a line connecting the point P and the axis w of the grinding wheel. In the above arrangement of the apparatus according to the invention a grinding wheel W having a given diameter can grind a work H on the work table to a curved surface C by two rotations of the outer cylinder 1 in a direction and at the same time one rotation of the work table in the opposite direction during two rocking movements or two reciprocations of the rocking plate within the angle $2\phi$ about the point P.

In the apparatus according to the invention, the length of the trochoid radius R, that is, the position of the point P is variable and the rocking angle $\phi$ is also adjustable to accommodate different peritrochoid curves. One embodiment of the apparatus will be explained referring to FIGS. 5, 6 and 7. The base plate 14 which is horizontally fixed to the column on the base is formed with an opening 14a and a guide way 14b near thereof (FIG. 6). A ring bearing plate 16 which is a rectangular plate and formed in its center with a tapered or conical opening 16a is slidable along the guide way 14b on the base plate and can be fixed to the base plate by means of a setscrew 17 after it has been positioned in place. For this purpose the base plate is provided with a screw shaft 14c. The rocking plate 15 is formed with a circular opening 15a surrounded by a ring formation comprising an annular boss 15e having a conical surface and with a guide way 15b and an elongated slot 15c in parallel with the guide way 14b. The annular base 15e is rotatably supported within the conical opening 16a of the ring bearing plate 16 with their tapered or conical surfaces. The column 18 is provided with a vertical slide way 18a for a saddle 19 and is slidable along the guide way 15b on the rocking plate 15 by means of a screw shaft 15d provided on the plate 15. The saddle 19 is vertically slidable along the slide way 18a of the column and rotatably and vertically supports a spindle 20 which passes slidably through an aperture formed in a base of the column 18 and loosely through the openings 15a and 16a and is provided at its lower end with a grinding wheel W. The spindle 20 is rotatively driven by a motor M2 mounted on the saddle 19 through a belt and a pair of pulleys arranged in the saddle 19. The saddle 19 is provided therein with a hydraulic cylinder 21 fixed thereto and depending vertically therefrom, which has a piston rod 22 of which lower end is fixed to the base of the column, which enables the saddle 19 with the spindle 20 to move vertically when fluid under pressure is supplied into the head end or rod end side in the cylinder 21. A crank disc 23 is fixed to one end of a vertical shaft 24 rotatable in place and is provided on its upper surface with a crank pin 23a which is adapted to be fixed thereto and adjustable in a radial direction of the disc 23 and engages the inside of the slot 15c of the rocking plate 15. Consequently, when the vertical shaft 24 rotates, the rocking plate 15 will rock about the opening 16a of the plate 16. It is understood that the maximum rocking angle is adjustable by a selection of the position of the crank pin 23a on the disc 23.

If it is desired to vary the peritrochoid generating radius R, the setscrew 17 is untightened, permitting the plate 16 to be adjustably slidable by means of the screw 14c. The rocking plate 15 will rock about the center of the opening 16a of the plate 16, which must be coincident with the point P where the grinding wheel W contacts the trochoid curved surface C. Thus the plate 16 is slidably adjusted and fixed again to the base plate by the setscrew 17 in a manner such that the center of the opening 16a is brought in the curved surface C of the workpiece H located on the work table. In effect, the grinding wheel W is first positioned in a place somewhat spaced to the left from the position shown in FIG. 7 and after the saddle 19 has been lowered to a desired level the wheel W is advanced to the position shown in FIG. 7 together with the column 18 and saddle 19 with the aid of the screw shaft 15d. As can be seen from the above described that the trochoid radius R is adjustable by the sliding adjustment of the plate 16. On the other hand the vertical shaft 24 is held in a determined position and the crank pin 23a on the disc 23 at the upper end of the shaft 24 engages the slot 15c of the rocking plate 15. As above described, however, the crank pin 23a is adjustable in the radial direction of the crank disc, thus permitting the rocking angle $\phi$ to be adjustable.

It is noted that the invention provides the apparatus capable of generating peritrochoid curves or curved surfaces in mechanical manner employing mainly the gear trains and capable of working of articles having peritrochoid curved surfaces different in eccentricity and generating radius by a simple adjustment of parts.

It is further understood by those skilled in the art that the foregoing description is preferred embodiments of the disclosed apparatus and that various changes and modifications may be made in the invention without departing from the spirit and scope thereof.

What is claimed is:

1. A peritrochoid curve surface generating apparatus comprising an outer cylinder rotatably supported by a frame on a base and formed in its upper end with an eccentric opening, an inner cylinder formed with an eccentric opening eccentric to its axis and accommodated within and fixed to said eccentric opening of said outer cylinder in an adjustable angular relationship therebetween, the outer cylinder defining a base circle and the inner cylinder defining a rolling circle for the peritroichoidal curved surface, each of said base and rolling circles having a radius, rotation of the inner cylinder relative to the outer cylinder changing a difference between radii of the base and rolling circles for the peritrochoid curved surface to vary its characteristic, clamping means for clamping said inner cylinder to said outer cylinder, a first central shaft rotatably journaled in an axis of said outer cylinder, an inner cylinder central shaft rotatably journaled in an axis of said inner cylinder, a second central shaft rotatably journaled in said eccentric opening of said inner cylinder, a work table fixed to an upper end of said second central shaft, a gear train for transmitting a rotation of said first central shaft to said second central shaft through said inner cylinder central shaft, rocking means rockable within a predetermined angle about a predetermined point, a cylindrical tool rotatable about its axis and mounted on said rocking means, the circumference of said tool being in contact with the rocking axis of said rocking means, and means for driving said outer cylinder and said inner cylinder in a determined geared relation and rocking said rocking means in a geared relation to the rotation of said outer cylinder.

2. An apparatus as set forth in claim 1 wherein said inner cylinder has a top flange and said clamping means for clamping said inner cylinder to said outer cylinder comprises a fastening ring securely mounted on said outer cylinder and located over and encircling said top flange of said inner cylinder, said ring being formed with a series of threaded holes, setscrews threadily fitted within said threaded holes and said setscrews adapted to be tightened subsequent to the adjustment of said inner cylinder in the eccentric opening of the outer cylinder to meet a peritrochoid curve to be generated.

3. An apparatus as set forth in claim 1, wherein said rocking means comprises a base plate positioned above said work table and fixed to a column on said base of the apparatus and a rocking plate within a determined angle about a determined point on said base plate.

4. An apparatus as set forth in claim 1, wherein said rocking means comprises a rectangular base plate substantially horizontally fixed to a column on a base above said work table and formed with an opening and a guide way, a ring bearing plate formed in its center with a circular opening and adapted to be fixed to said opening of said rectangular base plate after slidably adjusted along said guide way of said base plate, a rocking plate formed with a linear guide way and an elongated slot and formed with a circular opening surrounded by a ringlike formation said rocking plate being pivotally connected through said ringlike formation to said ring bearing plate, a column provided with a substantially vertical slideway and slidable along said guide way of said rocking plate, a saddle vertically slidable along said slide way of said column, a spindle rotatably supported vertically in said saddle and passing loosely through said openings of said rocking and ring bearing plates and provided at its lower end with said cylindrical tool, and a crank disc provided with a crank pin which is adjustable in a radial direction of the crank disc and engages the inside of said elongated slot, said crank disc being adapted to rotate in synchronism with the rotation of said outer cylinder, whereby the axis of the rocking movement and the maximum rocking angle of said rocking plate are adjustable.

5. An apparatus as set forth in claim 4, wherein said base plate is provided with a screw shaft for slidably moving said ring bearing plate along said guide way of the base plate and fastening means for securing said ring bearing plate to said base plate.

6. An apparatus as set forth in claim 4, wherein said saddle is provided therein with a hydraulic cylinder fixed thereto and depending therefrom, said cylinder having a piston rod of which lower end is fixed to a base of said column, which enables said saddle with said spindle to move vertically when fluid under pressure is supplied into the head end or rod end side in said cylinder.

* * * * *